United States Patent [19]

Gotou

[11] Patent Number: 5,898,364
[45] Date of Patent: Apr. 27, 1999

[54] ELECTRONIC EQUIPMENT HAVING VIBRATION MOTOR

[75] Inventor: Seiichirou Gotou, Shizuoka, Japan

[73] Assignee: NEC Corporation, Japan

[21] Appl. No.: 08/907,179

[22] Filed: Aug. 6, 1997

[30] Foreign Application Priority Data

Aug. 9, 1996 [JP] Japan ................ 8-226098

[51] Int. Cl.$^6$ ................................................ H04B 3/36
[52] U.S. Cl. ................ 340/407.1; 340/311.1; 340/825.44; 340/825.46
[58] Field of Search ................ 340/407.1, 311.1, 340/287, 298, 319, 321, 825.46, 825.44; 455/347, 351, 344

[56] References Cited

U.S. PATENT DOCUMENTS

| | | | |
|---|---|---|---|
| 3,618,070 | 11/1971 | Kagan | 340/825.46 |
| 3,623,064 | 11/1971 | Kagan | 340/825.46 |
| 3,911,416 | 10/1975 | Feder | 340/825.46 |
| 4,786,889 | 11/1988 | Hayasaka | 340/311.1 |
| 4,794,392 | 12/1988 | Selinko | 340/825.46 |
| 4,918,438 | 4/1990 | Yamasaki | 340/825.46 |
| 5,172,092 | 12/1992 | Nguyen et al. | 340/311.1 |
| 5,181,023 | 1/1993 | Fujii | 340/825.46 |
| 5,327,120 | 7/1994 | McKee et al. | 340/825.46 |
| 5,426,825 | 6/1995 | Soren et al. | 340/311.1 |
| 5,436,622 | 7/1995 | Gutman et al. | 340/825.46 |
| 5,554,971 | 9/1996 | Foster et al. | 340/825.46 |
| 5,602,432 | 2/1997 | Mizutani | 310/15 |
| 5,668,423 | 9/1997 | You et al. | 310/81 |
| 5,719,561 | 2/1998 | Gonzales | 340/825.46 |

FOREIGN PATENT DOCUMENTS

| | | |
|---|---|---|
| 3008360 | 12/1994 | Japan . |
| 8-51286 | 2/1996 | Japan . |
| 8-140298 | 5/1996 | Japan . |

*Primary Examiner*—Jeffery A. Hofsass
*Assistant Examiner*—Toan N. Pham
*Attorney, Agent, or Firm*—Ostrolenk, Faber, Gerb & Soffen, LLP

[57] ABSTRACT

An electronic equipment provided with a vibration motor is disclosed. The electronic equipment includes a holding member formed of a resilient material for holding an outer peripheral portion of the vibration motor and having a portion which is exposed in an open portion of a casing of the electronic equipment. The holding member has a contact portion held by at least one of the casing and a printed circuit board provided in the casing and protruding from the open portion. Since vibration generated by the vibration motor is transmitted through the contact portion of the contact portion directly to a bearer of the electronic equipment, the bearer can fell a call signal reliably and easily.

13 Claims, 6 Drawing Sheets

ELECTRONIC EQUIPMENT HAVING VIBRATION MOTOR

BACKGROUND OF THE INVENTION

1. Field of the Invention

The present invention relates to an electronic equipment utilizing vibration of a vibration motor means for noticing a call signal or alarm, etc., to a bearer of the electronic equipment and, particularly, to a structure of a holding member for supporting the vibration motor.

2. Description of the Related Art

Various electronic equipments, particularly, portable communication equipments such as selective call receivers or portable telephone sets usually notice a call to a bearer thereof by ringing. It has been known, however, that there may be situations such as conference, etc., in which ringing sound is undesirable. In order to make the portable communication device usable in such situation, there is a selective call receiver or a portable telephone set equipped with a vibration generator for noticing a call to a bearer of the receiver or telephone set by vibration. In the selective call receiver, etc., the vibration generator is constructed with a vibration motor having a rotary shaft mounted thereon with an eccentric weight and housed in a casing of the selective call receiver and vibration is generated by driving the vibration motor.

A conventional vibration motor used generally has an outer peripheral portion supported by a metal holding member and is fixed to a printed circuit board provided within a casing of an electronic equipment by soldering, etc., together with the holding member. The holding member for supporting the vibration motor, however, must be formed in advance on the printed circuit board in such a way that the holding member fits the outer periphery of the vibration motor, which causes the receiver to be expensive. Further, since the holding member is fixed directly on the printed circuit board, irregular sound tends to be produced due to resonance of the printed circuit board.

Japanese Patent Application Laid-open No. H8-051286 discloses a vibration motor holding structure in which a holding member formed of rubber or soft plastic material supports an outer periphery of a vibration motor and the holding member is fixed to a casing of an electronic equipment with the holding member being in between inner walls of the casing. Further, Japanese Patent Application Laid-open No. H8-140298 discloses a vibration motor holding structure in which a vibration motor is wrapped with a thin film of silicon rubber and is supported in between ribs formed on an inner wall of a casing of an electronic equipment. These vibration motor holding structures can restrict generation of irregular sound, are inexpensive and can be miniaturized.

However, conventional portable electronic equipments having the above described vibration motor holding structure have a common problem that it is relatively difficult for bearers of them to detect alarming vibration. That is, a bearer of the portable electronic equipment feels vibration noticing a call signal through the casing of the electronic equipment. In the conventional portable electronic equipment, since a source of vibration such as the vibration motor and the holding member, etc., are completely housed in the casing of the equipment, vibration generated by the vibration motor is diffused and is attenuated by the casing. Therefore, the bearer has to feel attenuated vibration at a surface of the casing. Further, since the casing is usually formed of plastic material or metal whose hardness is high and its surface is made smooth in view of the safety of bearer, the surface of the casing of the conventional vibration motor holding structure of the portable electronic equipment is not suitable in effectively transmitting vibration to the bearer.

SUMMARY OF THE INVENTION

An object of the present invention is to provide an electronic equipment having a vibration motor, which has a simple construction, can reliably transmit vibration informing a call externally so that a bearer can detect the vibration easily and can restrict generation of irregular sound.

That is, the electronic equipment having the vibration motor according to the present invention comprises a vibration motor holding member formed of a resilient material and supporting an outer periphery of the vibration motor, a portion of the holding member being exposed externally in an open portion of a casing of the electronic equipment. A portion of the holding member protrudes from the open portion of the casing of the electronic equipment. The holding member is supported by at least one of the casing of the electronic equipment and a printed circuit board provided in the casing. The opening portion may take in the form of a plurality of openings which may be formed in opposite surfaces of the casing of the electronic equipment, respectively. At least one protrusion having an area smaller than that of the open portion of the casing is formed on the exposed portion of the holding member. Further, the holding member for holding the vibration motor includes a holding portion for holding the vibration motor and an engaging portion supported by the casing of the electronic equipment or the printed circuit board in the casing, between which a thin-walled region is formed. The present invention is applied mainly to portable electronic equipments.

The holding member for supporting the vibration motor is formed of a resilient material, has a cavity in which the vibration motor is received and has at least one portion which is exposed in the opening of the casing when the holding member together with the vibration motor is installed in the cavity.

Since, with the above mentioned construction of the vibration motor holding member, the electronic equipment according to the present invention can transmit vibration generated by the vibration motor substantially directly to a bearer of, for example, a selective call receiver, only through the holding member, the bearer can reliably be noticed with a call signal easily.

BRIEF DESCRIPTION OF THE DRAWINGS

The above and other objects, features and advantages of the present invention will become apparent from the following detailed description when taken with the accompanying drawings in which.

DETAILED DESCRIPTION OF THE PREFERRED EMBODIMENTS

Figure 1:
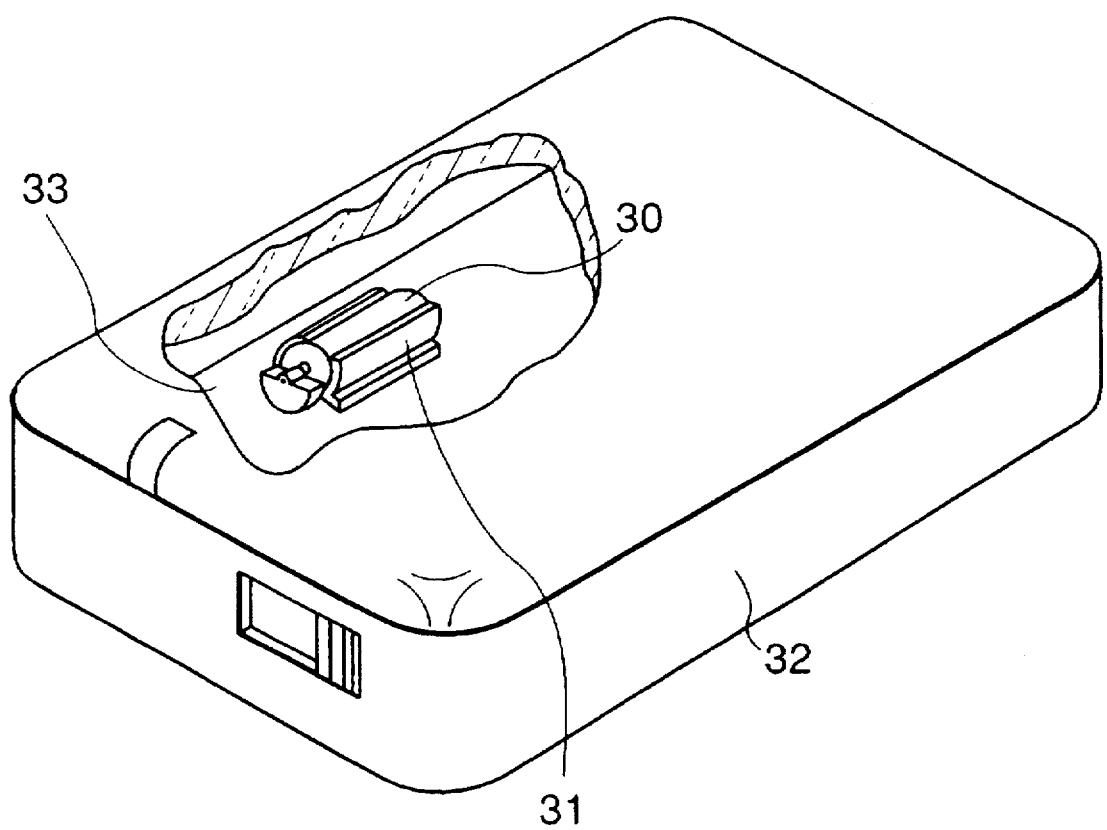
FIG. 1 is a perspective view of an example of a holding structure of a conventional vibration motor which is partially cut away, showing.
Figure 2:
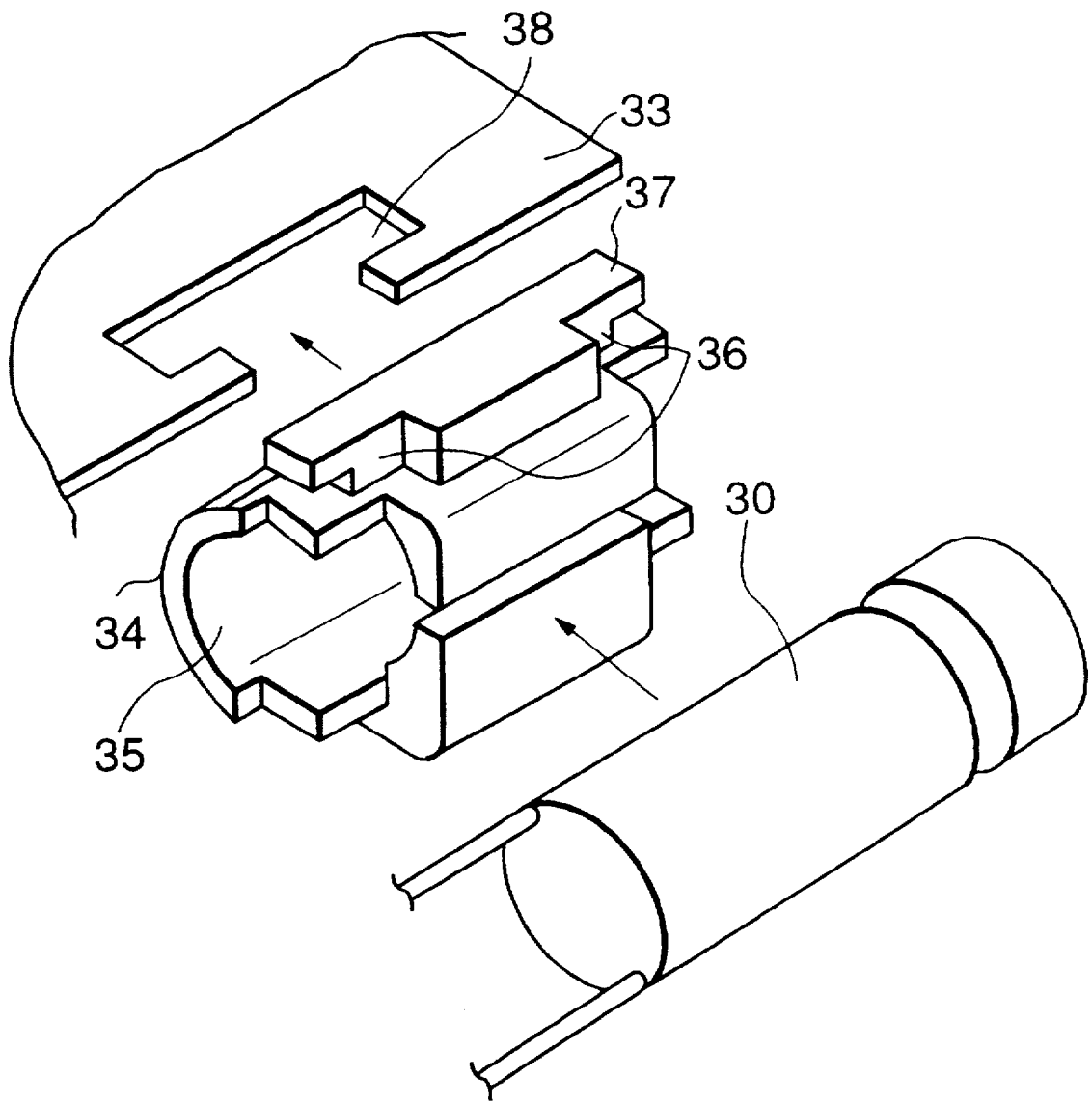
FIG. 2 is a perspective view of another example of a holding structure of a conventional vibration motor.

An example of a conventional holding member for holding a vibration motor will be described first for comparison purpose with the present invention. Referring to FIG. 1, a vibration motor 30 has an outer peripheral portion supported by a holding member 31 and is fixed to a printed circuit board 33 arranged within a casing 32 of an electronic equipment by soldering. Since, in such electronic equipment, the vibration motor 30 is fixed to the printed circuit board 33, irregular sound tends to be generated. Further, vibration generated by the vibration motor is not sufficiently transmitted to a surface of the casing of the electronic equipment. Referring to FIG. 2 which shows another example of the conventional holding member, a vibration motor 30 is supported by a holding member 34 formed of a material such as rubber or soft plastics which is capable of absorbing vibration. An outer peripheral portion of the vibration motor 30 is supported by a holding portion 35 of the holding member 34 and an engaging portion 36 of the holding member 34 is inserted into an engaging hole 38 formed in a printed circuit board 33. An inner surface of a casing holds tongue portions 37 of the holding member 34 to fix the holding member to the casing. In these structure, however, vibration generated by the vibration motor is not sufficiently transmitted to the surface of the casing of the electronic equipment although generation of irregular sound is restricted.

Figure 3:
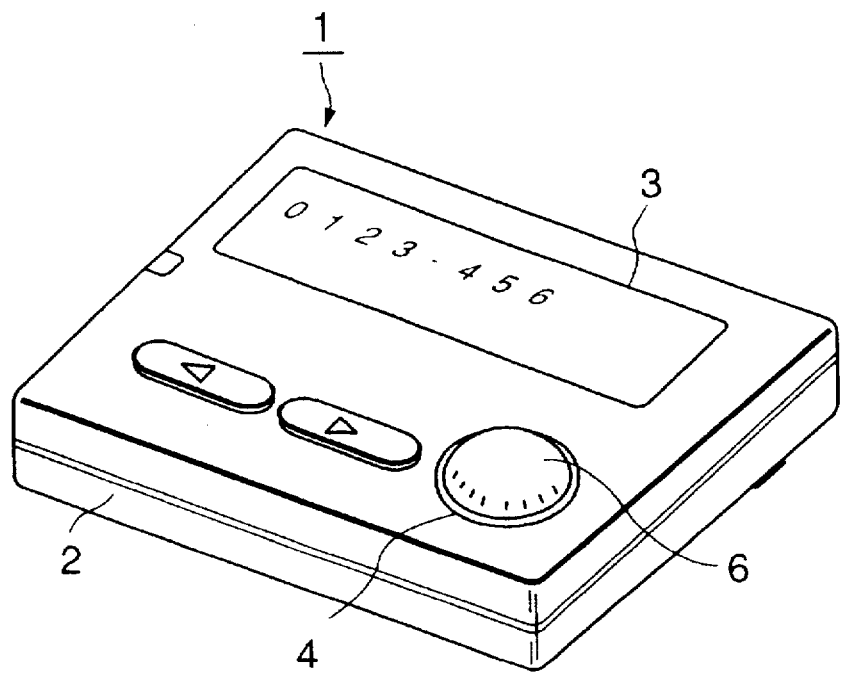
FIG. 3 is a perspective view of a selective call receiver to which a holding member of a vibration motor of the present invention is applied.

Now, an embodiment of the present invention will be described with reference to FIGS. 3 to 5. FIG. 3 is a perspective view of a pager to which a holding member for holding a vibration motor according to the present invention is applied. In a surface of a casing 2 of the pager 1, a display portion 3 and an open portion 4 are formed, together with function keys. A portion of the holding member of the vibration motor is exposed externally through the open portion 4 and constitutes a contact portion 6. The contact portion 6 is always in contact with a body or clothes of a bearer of the pager and transmits vibration from the vibration motor directly to the bearer when a call signal is received. Since the bearer detects vibration generated by the vibration motor through only the holding member, it is possible for the bearer to detect the call more reliably and easily compared with the conventional electronic equipment. Incidentally, the contact portion 6 may protrude from the surface of the casing 2 as shown in FIG. 3 or may be coplanar with the surface of the casing. Further, only a portion of the contact portion 6 exposed in the open portion 4 of the vibration motor holding member can be protruded from the surface of the casing.

Figure 4:
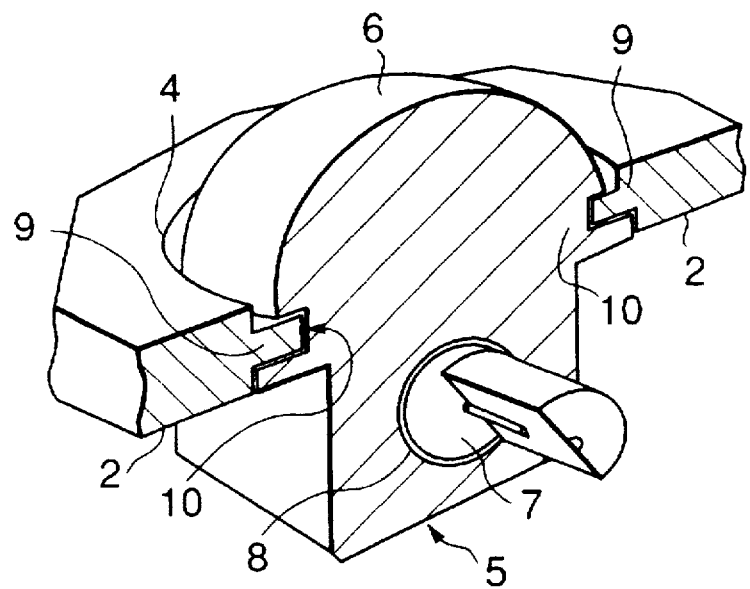
FIG. 4 is a partial cross section showing the holding member of the vibration motor of the present invention.

Referring to FIG. 4 which is a cross section of the holding member 5, the open portion 4 having a diameter of about 20 mm is formed in the casing 2 of the electronic equipment and the vibration motor holding member 5 formed of a resilient material such as silicon rubber or plastics is set in this open portion 4. The holding member 5 is directly fixed to the casing 2 by an engagement of an annular rib 9 protruding inward from an inner wall of the open portion 4 of the casing with an annular groove 10 formed in an outer surface portion of the contact portion 6 having a dome shape. The holding member 5 includes, in addition to the domed contact portion 6 which protrudes outward through the opening portion 4 by about 5 mm from a surface of the casing 2, a holding portion 8 in the form of a cylindrical hole for receiving a vibration motor 7. The holding member 5 can be substantially formed by using a metal mold.

Figure 5:
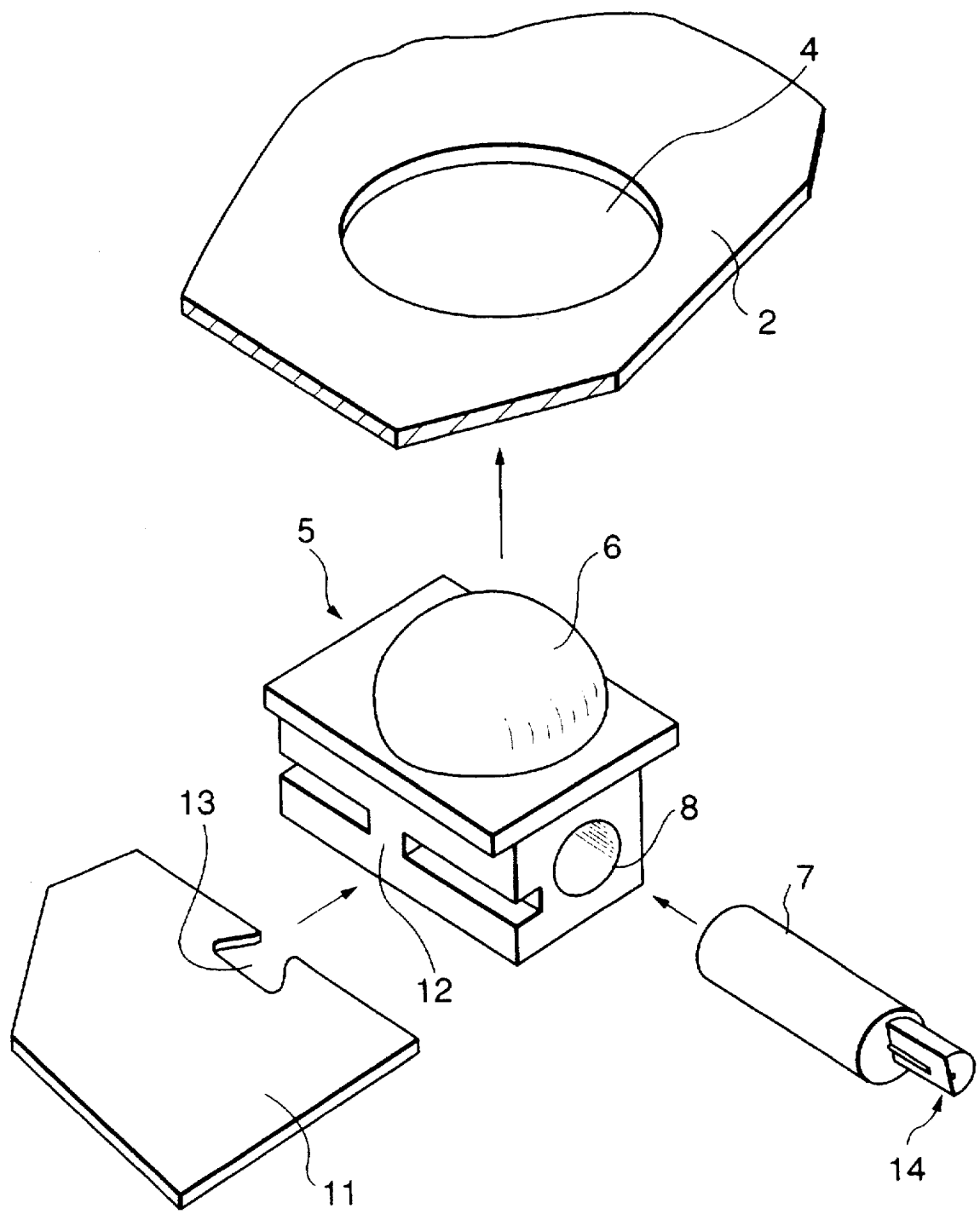
FIG. 5 shows an assembling of the holding member of the vibration motor of the present invention.

FIG. 5 is a perspective view of various parts of the embodiment of the present invention shown in FIGS. 3 and 4, showing an assembling thereof. First, the vibration motor 7 having a spindle on which an eccentric weight 14 is mounted is inserted into the holding portion 8 of the holding member 5. Then, the holding member 5 is fixed to a printed circuit board 11 by fitting a rib 12 provided in the holding member 5 in a recess 13 of the printed circuit board 11. Thereafter, the assembled holding member 5 and the printed circuit board 11 are fitted in the casing 2 with the dome contact portion 6 provided on the holding member 5 protruding outward from the open portion 4. That is, the holding member 5 according to this embodiment is supported by not the casing 2 of the electronic equipment but the printed circuit board 11 arranged in the casing.

In the above described embodiment, vibration is generated by the eccentric weight 14 mounted on the spindle of the vibration motor 7 when the vibration motor 7 rotates upon a call signal. Vibration thus generated is directly transmitted to the holding member 5 which is in intimate contact with the outer periphery of the vibration motor 7. Therefore, the contact portion 6 exposed outward of the casing from the open portion 4 formed in the surface of the casing directly transmits vibration generated by the vibration motor 7 externally and, thus, the bearer can feel the vibration exactly and reliably.

Figure 6:
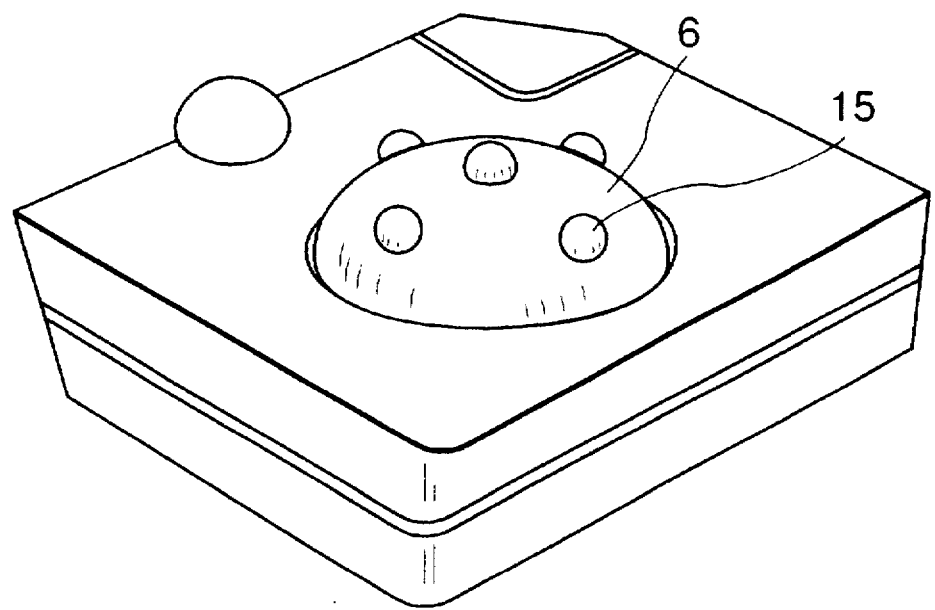
FIG. 6 is a partial perspective view of another example of the holding member of the vibration motor of the present invention.

FIG. 6 shows another embodiment of the present invention which is similar to the embodiment shown in FIG. 5 except that, in the embodiment shown in FIG. 6, a plurality of protrusions 15 are formed on the domed contact portion 6 protruding externally through the open portion 4 of the casing 2, by such as molding of the same material as that of the contact portion 6. The bearer can feel vibration more reliably and easily by increasing a surface area of the contact portion 6 by forming such protrusions 15. Such protrusions 15 may be also formed on the contact portion 6 which is coplanar with the surface of the casing 2.

Figure 7:
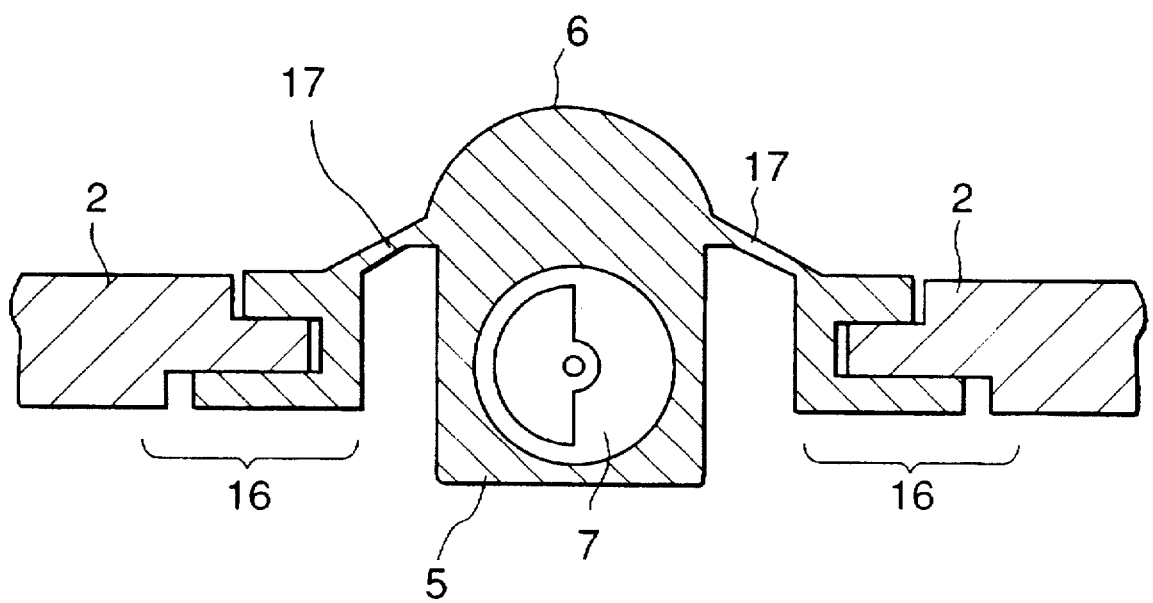
FIG. 7 is a partial cross sectional view of a further example of the holding member of the vibration motor of the present invention.

FIG. 7 is a cross section of another embodiment of the vibration motor holding member according to the present invention. A holding member 5 for holding a vibration motor 7 includes a holding portion which supports the vibration motor 7 and in which a contact portion 6 is formed and an engaging portion for coupling the holding portion 5 to a casing 2 of an electronic equipment. A thin-walled coupling portion 17 is formed between the holding portion and the engaging portion of the holding member 5 such that the coupling portion 17 surrounds the holding portion. The coupling portion 17 can transmit vibration generated by the vibration motor 7 to the whole holding member 5 with large amplitude, so that it is possible to vibrate the contact portion 6 more effectively. Further, since the vibration motor 7 is coupled to the casing 2 of the electronic equipment through the thin-walled portion 17, transmission of vibration of the holding member 5 to the casing 2 is restricted and generation of irregular sound is more effectively prevented from occurring.

Figure 8:
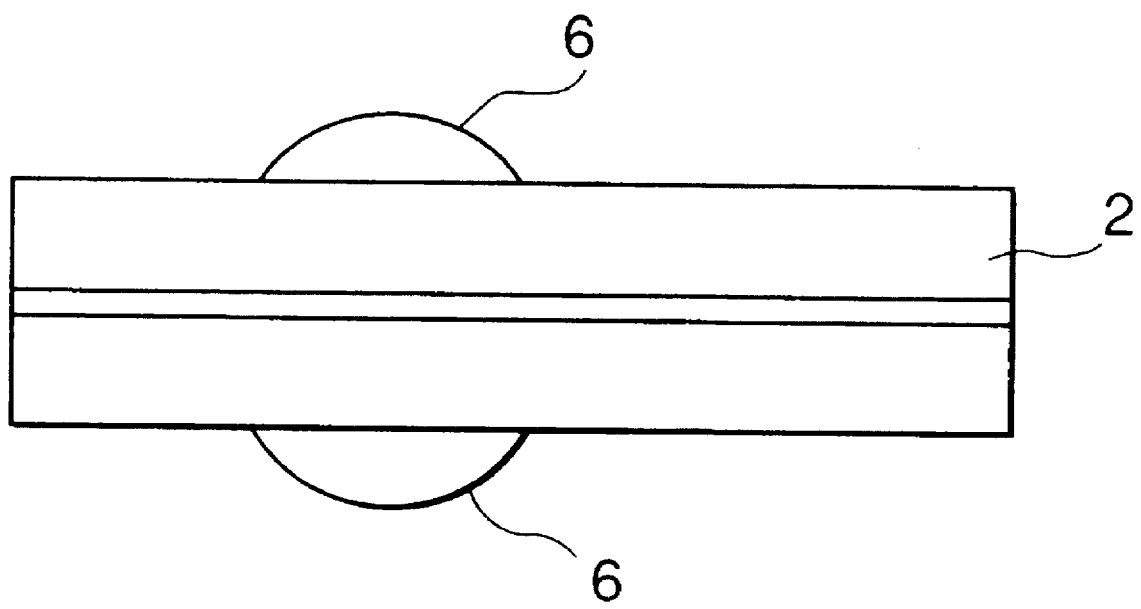
FIG. 8 is a side view of a still further example of the holding member of the vibration motor of the present invention.

FIG. 8 shows another embodiment of the present invention in which a pair of contact portions 6 are provided on a holding member 5 for holding a vibration motor 7 such that the contact portions 6 protrude from opposite surfaces of a casing of an electronic equipment. Since, therefore, at least one of the contact portions 6 contacts with a bearer necessarily, the bearer can feel vibration generated when a call signal is received, more reliably.

As described, since the electronic equipment according to the present invention has a structure with which vibration generated by the vibration motor can be transmitted directly to the bearer of the equipment only through the holding member, it is possible to exactly and reliably transmit vibration caused by a call signal to the bearer. Further, since, in the electronic equipment according to the present invention, vibration is hardly transmitted throughout the casing thereof, it is possible to effectively prevent irregular sound generated by a resonance of keys and/or the printed circuit board of the electronic equipment from occurring during the operation of the latter.

Further, with the provision of the thin-walled portion between the portion for holding the vibration motor 7 and the engaging portion for coupling the holding member 5 with the casing 2, it is possible to obtain a structure which can transmit vibration while preventing irregular noise from generating. Therefore, it is possible to reduce the size of the vibration motor compared with the conventional motor and to reduce a space of the electronic equipment and power consumption.

While the present invention has been described in connection with certain preferred embodiments, it is to be understood that the subject matter encompassed by the present invention is not limited to those specific embodiments. On the contrary, it is intended to include all alternatives, modifications and equivalents as can be included within the spirit and scope of the following claims.

What is claimed is:

1. An electronic equipment having a vibration motor, comprising:
   a holding member of a resilient material to hold said vibration motor, a portion of said holding member being exposed in an open portion of a casing of said electronic equipment, said holding member supported by at least one of said casing of said electronic equipment and a printed circuit board in said casing.

2. An electronic equipment as claimed in claim 1, wherein said holding member includes a holding portion for supporting said vibration motor, an engaging portion held by at least one of said casing and a printed circuit board in said casing and a thin-walled region formed between said holding portion and said engaging portion.

3. An electronic equipment as claimed in claim 1, wherein said electronic equipment is a portable electronic equipment.

4. An electronic equipment having a vibration motor, comprising:
   a holding member of a resilient material to hold said vibration motor, a portion of said holding member being exposed in an open portion of a casing of said electronic equipment, said open portion includes a plurality of openings.

5. An electronic equipment as claimed in claim 4, wherein said openings of said open portion are formed in opposite surfaces of said casing.

6. An electronic equipment as claimed in claim 4, wherein said electronic equipment is a portable electronic equipment.

7. An electronic equipment having a vibration motor, comprising:
   a holding member of a resilient material to hold said vibration motor, a portion of said holding member being exposed in an open portion of a casing of said electronic equipment, said exposed portion of said holding member having at least one protrusion having a smaller area than that of said open portion.

8. An electronic equipment as claimed in claim 7, wherein said electronic equipment is a portable electronic equipment.

9. A vibration motor holding member, comprising:
   a member of a resilient material to hold a vibration motor,
   a cavity portion receiving said vibration motor,
   at least one portion of said member to be exposed in an open portion of a casing of an electronic equipment when disposed in said casing, and
   said at least one portion has a dome shape to protrude from said casing.

10. A vibration motor holding member, comprising:
    a member of a resilient material to hold a vibration motor,
    a cavity portion receiving said vibration motor,
    at least one portion of said member to be exposed in an open portion of a casing of an electronic equipment when disposed in said casing, and
    said at least one portion having at least one protrusion having an area smaller than that of said open portion.

11. A vibration motor holding member, comprising:
    a member of a resilient material to hold a vibration motor,
    a cavity portion receiving said vibration motor,
    at least one portion of said member to be exposed in an open portion of a casing of an electronic equipment when disposed in said casing, and
    a portion coupling said holding member with at least one of said casing and a printed circuit board provided in said casing.

12. A vibration motor holding member as claimed in claim 11, further comprising a holding portion for supporting said vibration motor, an engaging portion held by at least one of said casing and a printed circuit board in said casing and a thin-walled region formed between said holding portion and said engaging portion.

13. A vibration motor provided in an electronic equipment, said vibration motor having an outer peripheral portion held by a holding member, said holding member comprising:
    at least one portion adapted to be exposed in an open portion of a casing of said electronic equipment,
    said holding member includes a portion to be held by at least one of said casing and a printed circuit board provided in said casing.

* * * * *